Patented Oct. 23, 1951

2,572,577

UNITED STATES PATENT OFFICE 2,572,577

REPELLENCE OF INSECTS

Carolyn E. Tissol, Minneapolis, Minn., and Lyle D. Goodhue, Bartlesville, Okla., assignors to Phillips Petroleum Company, a corporation of Delaware No Drawing. Application October 23, 1950, Serial No. 191,728

10 Claims. (Cl. 167—33)

This invention relates to methods and compositions for repelling insects. In a more specific aspect this invention relates to repellence of roaches and flies.

Roaches and flies are troublesome pests in homes, restaurants, grocery stores, and the like. The control of these pests by the use of ordinary insecticides is difficult because such materials have been found to be partially or entirely ineffective against them. Our invention is concerned with new and novel roach and fly repellents, and a method for their utilization in ridding these pests from surfaces otherwise frequented by them.

An object of our invention is to provide for the repellence of insects.

Another object of our invention is to provide new methods for repelling roaches and flies from surfaces otherwise frequented by them. Another object is to provide highly effective roach and fly repellent compositions. Another object is to provide a relatively inexpensive source of roach and fly repellent materials. Other objects and advantages will be apparent to those skilled in the art from the accompanying discussion and disclosure.

We have now discovered that 2,3,4,5-bis($\Delta^2$-butenylene) tetrahydrofurfural and derivatives thereof are effective agents for repelling roaches and flies from surfaces frequented by them, when applied to such a surface in any suitable form, such as a solution, dust, emulsion, aerosol, fog, or the like, or as a pure compound or a concentrate thereof. By way of example, we have found that it is convenient to dissolve 2,3,4,5-bis($\Delta^2$-butenylene) tetrahydrofurfural in a solvent, or otherwise employ it in a suitable carrier and apply the composition so formed. Solvents or carriers which we have found applicable to the present invention include those which are substantially inert with respect to the active repellent ingredient. Among those materials which are useful for this purpose are petrolatum, liquid polybutadiene, deodorized kerosene, naphthas, and other liquid hydrocarbons boiling preferably above atmospheric temperatures. Solid inert carrier materials are utilized, such as for example, talc, kieselguhr, and other inert carriers which may be used in preparing dusts. The active repellent ingredient of our invention may be applied in the form of an aqueous emulsion, preferably when employing a wetting agent, as for example, Span 20 (sorbitan monolaurate), Triton X100 (alkylated aryl polyether alcohol), Tween 20 (sorbitan monolaurate polyoxyethylene derivative), and others.

When employing the active repellent ingredient in a solvent or carrier, the lower effective limit of the ingredient concentration is about 0.5 per cent by weight. Similarly, when employing dusts, a concentration of the active ingredient is preferably within the limits of 1 to 20 weight per cent. However, there is no upper limit to the concentration that can be employed, except that dictated by economy. If desired, concentrations of the ingredient higher than 20 per cent can be utilized in any proportions, even as high as 90 per cent or higher. In some instances the active ingredient can be advantageously applied as the pure compound without a carrier of any kind, or in the form of a concentrate generally obtained during a specific preparation procedure described hereafter, wherein the material is produced as a by-product of an extractive distillation process utilizing furfural as the selective solvent in the resolution of $C_4$ hydrocarbon mixtures containing butadiene.

The repellent materials of our invention can be applied for their intended purpose in several ways. The most advantageous and presently preferred way is to spray a liquid composition on the surface to be treated. However, aerosols are employed advantageously in closed areas. The amount of active repellent material to be applied will be determined by the method of application. Generally, when a liquid composition is sprayed on the surface to be treated, about 0.4 to 10 grams of the active ingredient per 100 square feet of surface is advantageously applied. Larger or smaller amounts can be applied as desired.

The 2,3,4,5-bis($\Delta^2$-butenylene)-tetrahydrofurfural used as the preferred active repellent material of the present invention is a nearly water white liquid having a boiling point of 530 to 550° F. corrected. One method for the production of 2,3,4,5-bis($\Delta^2$-butenylene)-tetrahydrofurfural comprises the inter-reaction of 1,3-butadiene with furfural at a temperature of from 200° F. to 300° F. for from 5 to 100 hours under sufficient pressure to maintain the reactants in liquid phase. This and other suitable conditions and methods for making the compound are disclosed in the copending application of J. C. Hillyer and D. A. Nicewander, Serial No. 81,413, filed March 14, 1949. Reaction of a diolefin such as 1,3-butadiene and its immediate homologues with a furfural such as furfural itself and its immediate homologues produces polycyclic reaction products of varied constitution, which include materials which may broadly be referred to as butadiene-furfural copolymers. There can be isolated from the complex reaction products a compound having the probable formula 2,3,4,5-bis($\Delta^2$ - butenylene) - tetrahydrofurfural, being represented by the probable structural formula:

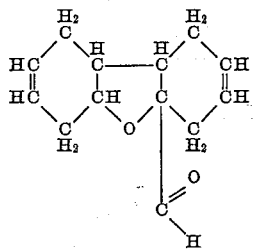

Fractions obtained by fractional distillation of furfural-butadiene reaction products, which fractions are composed of polycyclic reaction products including at least some 2,3,4,5-bis($\Delta^2$-butenylene)-tetrahydrofurfural, exhibit satisfactory roach repellent action in accordance with the present invention. Thus, the 2,3,4,5-bis($\Delta^2$-butenylene)-tetrahydrofurfural known to be an active ingredient need not necessarily be separated in its pure form prior to use. In addition to 1,3-butadiene and furfural as starting reactants, methyl derivatives thereof wherein not more than two carbon atoms of either the butadiene or the furfural has had a hydrogen atom replaced by a methyl group can be used to form the corresponding derivatives of 2,3,4,5-bis($\Delta^2$-butenylene)-tetrahydrofurfural which are employed in accordance with the present invention. Furthermore, chloroprene (2-chloro-1,3-butadiene), 1-chloro-1,3-butadiene, and methyl-substituted derivatives thereof wherein not more than one carbon atom has had a hydrogen atom replaced by a methyl group can be reacted with a furfural of the class described to produce the corresponding chlorine-containing derivatives of 2,3,4,5 - bis($\Delta^2$ - butenylene) - tetrahydrofurfural which exhibit high roach and fly repellent activity. Thus, the butadiene starting material is defined by the structural formula:

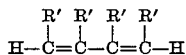

where each R' is hydrogen, methyl, or chloro and at least two R's are hydrogen. The furfural starting material is defined by the formula:

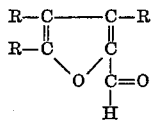

where each R is hydrogen or methyl and at least one R is hydrogen. The most commonly used reactants are 1,3-butadiene and furfural, isoprene and furfural, piperylene and furfural, chloroprene and furfural, and each of these diolefins with methyl furfural. All of these active roach repellent materials will be described generically herein by the term "a 2,3,4,5-bis($\Delta^2$-butenylene)-tetrahydrofurfural," and are represented by the formula:

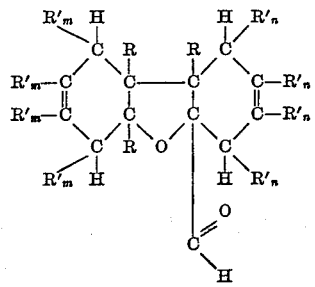

wherein R is selected from the group consisting of hydrogen and methyl, R'$_m$ is selected from the group consisting of hydrogen, methyl, and chloro, R'$_n$ is selected from the group consisting of hydrogen, methyl, and chloro, at least one R is hydrogen, at least two R'$_m$'s are hydrogen, and at least two R'$_n$'s are hydrogen.

Our invention is advantageously applied to repelling the roach species German cockroach, *Blatella germanica* (Linné), American cockroach, *Periplaneta americana* (Linné), Oriental cockroach, *Blatta orientalis* (Linné), and brown-banded cockroach, *Supella supellectilium* (Serville). These specices of roaches are common household pests and frequent only artificial or man made surfaces, as for example, floors, cupboards, and wall crevices associated with domestic units, hospitals, restaurants, grocery stores, and the like. These species of roaches do not frequent plant surfaces.

The advantages of this invention are illustrated in the following examples. The reactants and their proportions and their specific ingredients are presented as being typical and should not be construed to limit the invention unduly.

The following are examples of roach repellent compositions made according to our invention:

Example 1

| | [3] Parts |
|---|---|
| 2,3,4,5 - bis($\Delta^2$ - butenylene) - tetrahydrofurfural | 5 |
| Deodorized kerosene | 95 |

Example 2

| | [3] Parts |
|---|---|
| An aerosol composed of 2,3,4,5 - bis($\Delta^2$ - butenylene)-tetrahydrofurfural | 10 |
| Freon (a mixture of 45 parts of Freon 11[1] with 45 parts Freon 12[2]) | 90 |

[1] Freon 11 (trichlorofluoromethane).
[2] Freon 12 (dichlorodifluoromethane).

Example 3

| | [3] Parts |
|---|---|
| 2,3,4,5 - bis($\Delta^2$ - butenylene) - tetrahydrofurfural | 8 |
| Soltrol 140 (an isoparaffinic hydrocarbon fraction boiling between 360 and 410° F. at 760 mm.) | 92 |

Example 4

| | [3] Parts |
|---|---|
| 2,3,4,5 - bis($\Delta^2$ - butenylene) - tetrahydrofurfural | 20 |
| Triton X–100 wetting agent (alkylated aryl poly ether alcohol) | 2 |
| Water | 78 |

[3] By weight.

The following examples will serve to illustrate the effectiveness of the compositions of our invention:

Example 5

Twenty-five cc. of the composition of Example 3 was sprayed on the floor and other surfaces in one of two adjoining darkened rooms each badly infested with roaches, while the other darkened room was left untreated. The test was conducted for a period of eight weeks, during the last two to three days of which roaches were observed to be initially returning to the treated room. The untreated room, however, was regularly frequented by the pests during the entire eight week period.

Example 6

Laboratory starvation tests were made which vividly demonstrate the effectiveness of our repellents. These tests were conducted in the following manner:

Five American roaches *Periplaneta americana*, provided with only water, were starved for a period of seven days and then placed in a cage with a pellet (approximate cube ½ inch on a side) of a commercial dog food preparation. The pellet had been impregnated with 0.1 gram of 2,3,4,5 - bis($\Delta^2$ - butenylene) - tetrahydrofurfural dissolved in a small quantity of acetone, after which the acetone was completely removed from the pellet by evaporation.

The roaches entirely avoided the food for five days, and no detectable amounts of the food were eaten at the end of seven days. From the eighth to the tenth day the roaches ate extremely small amounts from the pellet.

Example 7

Two identical shelters made from pint cardboard cartons were placed in an inverted position in a wire cage 18 x 10 x 9 inches. The cartons had a notch cut in the rim to permit roaches to enter. Food and water were provided within the wire cage.

Five cc. of a one per cent acetone solution of 2,3,4,5 - bis($\Delta^2$ - butenylene) - tetrahydrofurfural was placed in one carton. The carton was revolved until the solution coated the entire inner surface thereof. The acetone was then allowed to evaporate completely. The other carton was untreated.

Ten young adult roaches were placed in the cage in a lighted room, and all sought shelter in the untreated carton. The roaches completely avoided the treated carton for four days.

Example 8

In accordance with the Sandwich Bait Method described by L. B. Kilgore in Soap, June 1949, several 1 x 4 inch strips of cardboard were coated with a smooth thin film of unsulfured molasses leaving an uncoated margin about ¼ inch on all four sides. The prepared cardboard strips were then oven-dried at 45° C.

Highly porous paper strips, cut from cushion sheets used in mimeograph stencils, were impregnated with 2,3,4,5-bis($\Delta^2$-butenylene)-tetrahydrofurfural, in varied amounts. Impregnation of the porous strips was effected by immersing them in an acetone solution of the 2,3,4,5-bis($\Delta^2$-butenylene)-tetrahydrofurfural, and then allowing the strip to dry over a period of from 4 to 6 hours. The impregnated strips were the same size as the baited cardboards. An impregnated strip was superimposed on each baited cardboard and fastened in place by stapling. The loose fiber construction of the impregnated paper permits the fly to remove the molasses through it.

The prepared strips, i. e., the sandwich bait, were then exposed to house flies (*Musca domestica*), over 5 days old, which had been starved for 6 hours. Counts of the number of flies feeding on the strips were taken periodically for 2½ hours. A non-repellant material in the sandwich bait becomes black with flies soon after being exposed and the bait will often be entirely consumed in 5 minutes.

The results of the tests of 2,3,4,5-bis($\Delta^2$-butenylene-tetrahydrofurfural as a fly repellent in accordance with the method described above are tabulated as follows:

| Conc., per cent [1] | Number of Flies Feeding | | | | | | |
|---|---|---|---|---|---|---|---|
| | 15— | 30— | 45— | 60— | 90— | 120— | 150— |
| 25 | 0 | 0 | 0 | 0 | 0 | 0 | 0 |
| 10 | 0 | 0 | 0 | 0 | 0 | 0 | 0 |
| 5 | 0 | 0 | 0 | 0 | 0 | 1 | 6 |
| 1 | 32 | 27 | 0 | 1 | 17 | 4 | 5 |

[1] Concentration of 2,3,4,5-bis($\Delta^2$-butenylene)-tetrahydrofurfural in acetone solution employed in impregnation of porous strips.

As will be evident to those skilled in the art, various modifications can be made or followed, in the light of the foregoing disclosure and discussion, without departing from the spirit or scope of the disclosure or from the scope of the claims.

We claim:

1. A method for repelling insects from a type surface frequented by them, comprising applying thereto a material comprising a compound of the formula

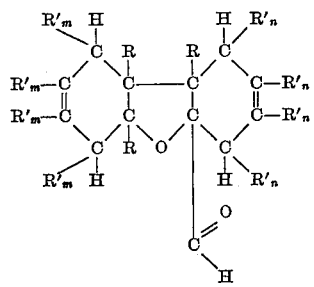

wherein R is selected from the group consisting of hydrogen and methyl, $R'_m$ is selected from the group consisting of hydrogen, methyl, and chloro, $R'_n$ is selected from the group consisting of hydrogen, methyl, and chloro, at least one R is hydrogen, at least two $R'_m$'s are hydrogen, and at least two $R'_n$'s are hydrogen.

2. A method for rendering a surface roach repellent, comprising applying thereto a 2,3,4,5-bis($\Delta^2$-butenylene)-tetrahydrofurfural associated with a carrier in an amount of at least 1 per cent by weight.

3. A method for rendering a surface roach repellent, comprising 2,3,4,5-bis($\Delta^2$-butenylene)-tetrahydrofurfural thereto.

4. The method of claim 2 wherein said 2,3,4,5-bis($\Delta^2$-butenylene)-tetrahydrofurfural is dissolved in a hydrocarbon solvent in a proportion of at least 1 per cent by weight.

5. The method of claim 2 wherein said 2,3,4,5-bis($\Delta^2$-butenylene)-tetrahydrofurfural is in an aqueous emulsion.

6. The method of claim 2 wherein said 2,3,4,5- bis($\Delta^2$-butenylene)-tetrahydrofurfural is associated with a finely divided solid material, as a dust.

7. A method for rendering a surface roach repellent that is otherwise frequented by roaches, comprising applying thereto a polycyclic reaction product of a 1,3-butadiene compound with a furfural containing a 2,3,4,5-bis($\Delta^2$-butenylene)-tetrahydrofurfural.

8. A method for repelling roaches from a surface otherwise frequented by them, said roaches consisting of at least one of the species German cockroach, *Blatella germanica* (Linné), American cockroach, *Periplaneta americana* (Linné), Oriental cockroach, *Blatta orientalis* (Linné), and brown-banded cockroach, *Supella supellectilium* (Serville), said method comprising applying to such a surface only sufficient 2,3,4,5-bis($\Delta^2$-butenylene)-tetrahydrofurfural to render said surface repellent to such roaches.

9. The method of claim 8 wherein said 2,3,4,5-bis($\Delta^2$-butenylene)-tetrahydrofurfural is applied to said surface admixed in a concentration of at least one per cent by weight in a carrier, and in an amount of from 0.4 to 10 grams per 100 square feet of said surface.

10. A method for rendering a surface fly repellent, comprising applying 2,3,4,5-bis($\Delta^2$-butenylene)-tetrahydrofurfural thereto.

CAROLYN E. TISSOL.
LYLE D. GOODHUE.

No references cited.